T. WELHAM, dec'd.
J. T. WELHAM, Adm'r.
Universal Shaftings.
No. 5,977. Reissued July 21, 1874.
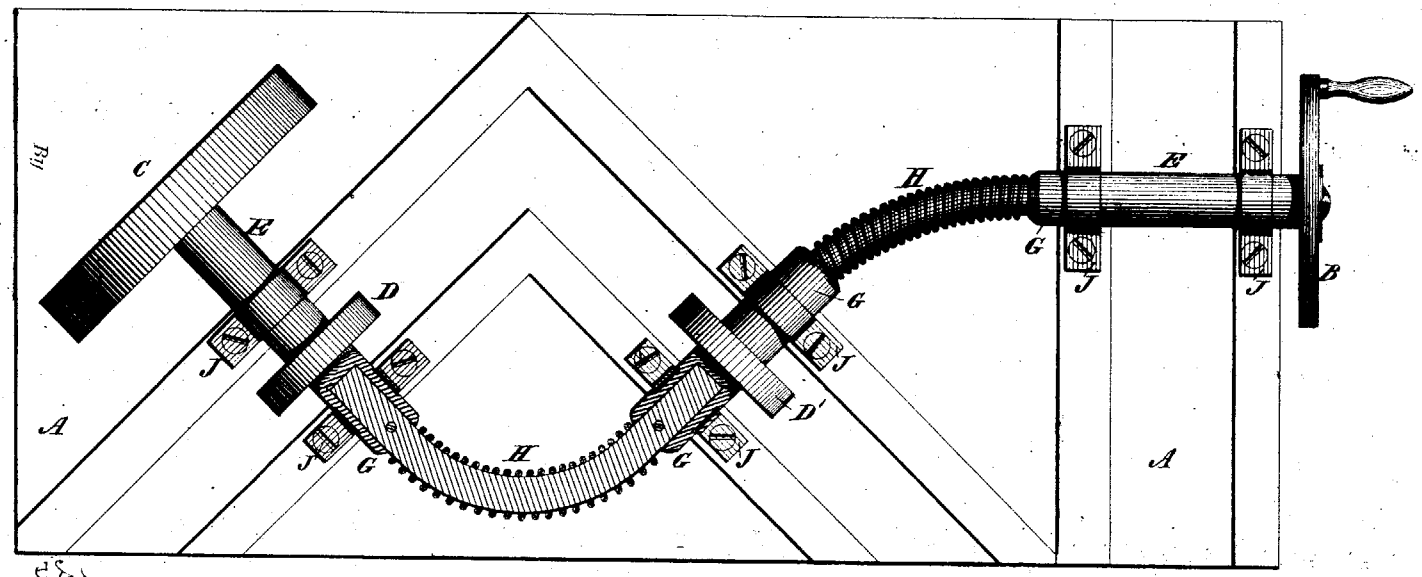
WITNESSES
Harry King
E. D. Davidson
INVENTOR
S. S. White
Assignee of
Thos Welham
By
Wm. Baldwin
his Attorney

UNITED STATES PATENT OFFICE.

SAMUEL S. WHITE, OF PHILADELPHIA, PENNSYLVANIA, ASSIGNEE, BY MESNE ASSIGNMENTS, OF J. T. WELHAM, ADMINISTRATOR OF THOMAS WELHAM, DECEASED.

IMPROVEMENT IN UNIVERSAL SHAFTING.

Specification forming part of Letters Patent No. 46,166, dated January 31, 1865; reissue No. 5,977, dated July 21, 1874; application filed July 1, 1874.

*To all whom it may concern:*

Be it known that THOMAS WELHAM, deceased, formerly of Washington city, in the District of Columbia, did in his life-time invent certain new and useful Improvements in Shafting, which he called "Universal Shafting;" and I do hereby declare the following to be an exact description thereof, reference being had to the accompanying drawing, which makes a part of this specification, and which represents a plan view, partly in section, of an apparatus for communicating power, in which said improvements are embodied.

The said invention relates to a shaft, made of flexible material, capable of being rotated and adapted to be adjusted at any desired angle relative to the driving-shaft for the purpose of driving machinery of all kinds. The subject-matter claimed is hereinafter designated.

In the accompanying drawing, the mechanism is shown as mounted in or upon a suitable base or frame, A, upon which the shaft rests, so as to show its operation. A driving-wheel, B, is fixed on the solid or stiff part E of the shaft, which solid part is mounted in suitable bearings J in the frame, as usual. A balance or fly wheel, C, is shown as likewise mounted on the solid or stiff part of the shaft. Band-wheels D D′ are also shown as mounted on the solid portions of the shaft. These stiff, solid, or iron parts of the shafts have socket ends G, in which the ends of the flexible portions H of the shafts are fastened permanently by rivets or otherwise. The flexible portions H of the shaft are made of gum-elastic or rolled canvas, or any other flexible material, either lapped or braided, either hollow or solid, so that the shaft can be operated in any position, either vertical, horizontal, curved, or at any angle. These flexible parts of the shaft are surrounded on the outside with wire of sufficient strength, according to the size and power of the shafts, and the wire is wrapped in a coil on the outside, or layers of wire are put on the inside, for the purpose of strengthening the flexible material, and of preventing it from twisting out of shape.

Jointed or flexible shafts having been used prior to this invention of THOMAS WELHAM, he is not claimed to be the inventor, broadly, of every form of flexible shaft.

What is claimed herein as the invention of the said THOMAS WELHAM is—

1. The combination of a stiff shaft mounted in bearings in a frame, a driving-wheel mounted on said shaft, and a shaft made of flexible material, connected with the stiff shaft, and adapted to be operated at any desired angle, substantially as set forth.

2. The combination of the driving-wheel, its stiff shaft, the shaft made of flexible material, and a stiff shaft connected with and adapted to be driven by the flexible shaft, substantially as set forth.

3. A compound driving-shaft composed of stiff sections, united by a flexible shaft, composed of elastic material, combined with a wire coil, and capable of being rotated, substantially as set forth.

SAMUEL S. WHITE,
*Assignee of Thomas Welham, deceased.*

Witnesses:
ROBT. E. PATTISON,
S. T. JONES.